Jan. 28, 1969  H. O. SCHERENBERG  3,423,927
INSTALLATION FOR THE OPERATION OF A DIESEL
ENGINE WITH EXHAUST GAS TURBO-CHARGER
Filed Oct. 27, 1966
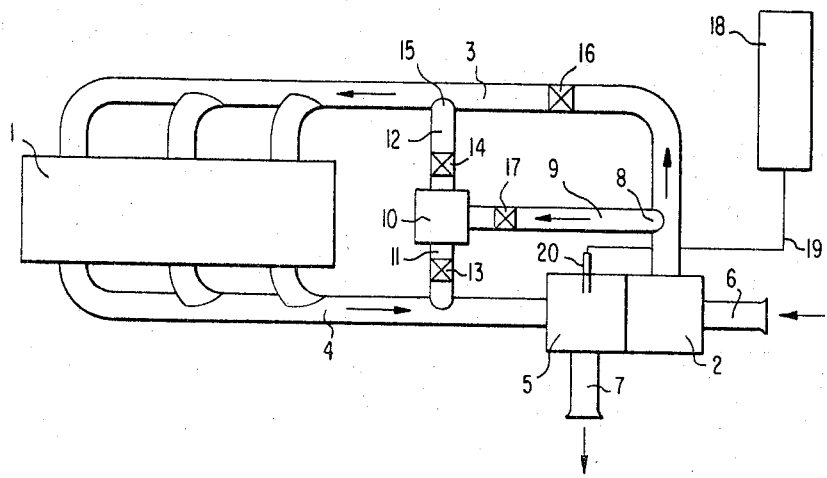
INVENTOR
HANS O. SCHERENBERG
BY  *Dicke & Craig*
ATTORNEYS

United States Patent Office 3,423,927
Patented Jan. 28, 1969

3,423,927
INSTALLATION FOR THE OPERATION OF A DIESEL ENGINE WITH EXHAUST GAS TURBO-CHARGER
Hans O. Scherenberg, Stuttgart-Heumaden, Germany, assignor to Daimler-Benz Aktiengesellschaft, Stuttgart-Unterturkheim, Germany
Filed Oct. 27, 1966, Ser. No. 589,998
Claims priority, application Germany, Oct. 28, 1965,
D 48,536
U.S. Cl. 60—13                       2 Claims
Int. Cl. F02b 41/10

ABSTRACT OF THE DISCLOSURE

A diesel engine provided with an exhaust gas turbine driving a supercharger compressor for the inlet air is provided with an auxiliary combustion chamber receiving fresh inlet air directly from the compressor through a regulating valve to be burned with a fuel and selectively delivered to the engine inlet line downstream of the inlet throttle valve and/or to the exhaust gas line leading to the turbine by means of valved conduits. Compressed air may also be independently supplied to the turbine.

Background of the invention

As known, it is not always possible to start the diesel engine operating with auto-ignition without a suitable starting assist. Notwithstanding the considerably higher compression ratios as compared to engines with externally controlled ignitions, one utilizes as a rule special glow or heater plugs which assure a rapid and reliable starting. However, these difficulties become even greater if one goes over to replacing the diesel fuel which has a relatively good ignition quality with another fuel, especially with a high octane fuel which has a considerably lesser ignition quality. The lesser ignition quality and the larger ignition delay of the other fuels stand obstructingly in the way to the aim to be able to operate a conventional diesel engine according to the diesel method as so-called "multi-fuel engine" also with fuels other than diesel fuels. Especially with high octane fuels the starting and the lower partial-load operation offer considerable difficulties.

Summary of the invention

The present invention aims at so completing the known diesel method of the aforementioned diesel engines that also other fuels, especially high octane fuels can be utilized in these engines without starting and operating difficulties.

The underlying problems are solved by the present invention in that the compressed air produced by a conventional starting of the exhaust gas turbo-charger of the diesel engine of the type mentioned above is supplied at first to a combustion chamber with the engine still at standing-still and the combustion gases produced therein are supplied to the exhaust gas turbine of the exhaust gas turbo-charger.

As a result of such an additional drive of the exhaust gas turbo-charger there exists the possibility to impart to the charging air of the diesel engine already beforehand a considerably higher pressure as compared to the normal starting condition heretofore, which higher pressure enables without difficulty the starting even with the use of fuels other than Diesel fuels.

Especially with the use of high octane fuels, it is appropriate according to a preferred construction of the present invention if the additional feed or charge of the exhaust gas turbine by way of the combustion chamber is continued also after the starting during a partial load operation of the engine by means of compressed air branched off from the charging air of the engine and fed to the combustion chamber.

According to another construction of the present invention, the starting and also the partial load operation may be further improved if a portion of the produced combustion gases of the combustion chamber or of the combustion gases of the diesel engine is utilized for heating up the charging air supplied to the engine and is additionally introduced, for example, itself into the charging air line leading to the engine. The overload operation of the diesel engine can additionally be further improved also in a simple manner if according to still another realization of the method according to the present invention, the additional feed or charge of the exhaust gas turbine takes place by way of the combustion chamber also during an overload operation of the engine. Such an additional drive of the exhaust gas turbo-charger makes possible a particularly increased charging pressure for the diesel engine.

A diesel engine for realizing one of the aforementioned methods is equipped according to the present invention with a combustion chamber giving off its combustion gases into the exhaust gas line of the engine, which combustion chamber is operatively interconnected between its charging air line and its exhaust gas line within the area between the exhaust gas turbo-charger and the engine and is fed from the charging air line. This combustion chamber may, according to a further feature of the present invention, be operatively connected by way of a second exhaust gas line with a connecting place of the charging air line which is located with respect to the connecting place of the air supply line thereof on the side of the engine, i.e. downstream, whereby a throttling device is arranged in the charging air line between the two connecting places.

Accordingly, it is an object of the present invention to provide a method and apparatus for operating a diesel engine having an exhaust gas turbo-charger which obviates by simple and highly effective means the aforementioned shortcomings and drawbacks encountered with the prior art constructions.

Another object of the present invention resides in a method and installation for operating a diesel engine which permits use of diesel fuels as well as other fuels such as high octane fuels for the operation of the diesel engine.

A further object of the present invention resides in a method for operating a diesel engine and in an apparatus for carrying out such method which permits starting of the diesel engine without difficulties notwithstanding the use of the most different types of fuels.

Still another object of the present invention resides in a method of operating a diesel engine as multi-fuel engine and into an apparatus for carrying out this method which not only assures reliable starting regardless of the type of fuel used but additionally improves the operating conditions of the engine during partial load and excess load operations.

Brief description of the drawing

These and further objects, features, and advantages of the present invention will become more obvious from the following description when taken in connection with the accompanying drawing which shows, for purposes of illustration only, one embodiment in accordance with the present invention, and wherein:

The single figure is a schematic view of one embodiment of a Diesel engine installation in accordance with the present invention.

Detailed description of the drawing

Referring now to the single figure of the drawing, the diesel engine illustrated therein is designated by reference numeral 1. The diesel engine 1 is supplied with charging air having a higher pressure compared to the atmosphere from a conventional compressor or supercharger 2 by way of conventional charging air line 3. The exhaust gases of the engine 1 are supplied by way of a conventional exhaust gas line 4 to a conventional exhaust gas turbine 5 which, together with the supercharger 2, forms a conventional exhaust gas turbo-charger. The supercharger 2 sucks in the air out of the free atmosphere through the connecting piece 6 whereas the exhaust gas turbine 5 gives off the exhaust gases through an exhaust pipe 7 into the free atmosphere.

A branched-off air-supply line 9 leads from a branching place 8 in the charging air line 3 located near the exhaust gas turbo-charger to a combustion chamber 10 arranged between the charging air line 3 and the exhaust gas line 4; the combustion gases of the combustion chamber 10 may be selectively supplied by way of one line each 11 and 12 having conventional built-in control devices 13 and 14 selectively and in a manner to be described more fully hereinafter also simultaneously to the exhaust gas line 4, and/or the charging air line 3. A conventional throttling device 16 is additionally arranged between the branching place 8 of the air supply line 9 and the discharge place 15 of the line 12 into the charging air line 3, while additionally a controllable closure member 17 also of conventional construction is additionally provided in the air supply line 9.

According to the illustrated embodiment a conventional compressed air source 18 serves for starting the exhaust gas turbo-charger 5, 2 whereby compressed air is supplied from the compressed air source 18 by way of a line 19 to a starting nozzle 20 arranged on the inlet side of the turbine rotor as is conventional.

*Operation*

The diesel engine 1 may be operated by means of the described installation as follows:

With a diesel engine 1 still at stand-still, at first the exhaust gas turbo-charger is started by supplying compressed air to the starting nozzle 20 whereby the control devices 13 and 16 as well as the closure member 17 are opened whereas the control device 14 is initially closed. The air supplied to the combustion chamber 10 is then combusted by means of a conventional burner, not illustrated in detail herein since it forms no part of the present invention and the combustion gases produced thereby flow at first to the exhaust gas turbine 5 while the engine is still at stand-still whereby the turbine 5 is accelerated accordingly. The rotational speed of the supercharger 2 increases correspondingly and the charging pressure may be adjusted at will to any desired high value prior to the starting of the diesel engine 1 itself.

Owing to the high charging pressure and the higher charging air temperature connected therewith, particularly favorable starting conditions are created for the diesel engine 1 to be started now, which assure a reliable continuous operation or running of the engine, even if the engine is operated with a fuel other than diesel fuel, for example, with gasoline.

For purposes of a further improvement of the starting conditions, a portion of the combustion gases of the combustion chamber 10 may be introduced, if so desired, by way of the line 12 and the correspondingly open control device 14 into the charging air line 3, in which case the throttling member 16 may be additionally actuated by conventional means. The further increase of the charging air temperature caused thereby assures a corresponding further improvement of the starting quality of the diesel engine 1.

If combustion difficulties should arise during the operation of the diesel engine 1 in the partial load range, i.e., at low load or low rotational speed, by reason of excessively low charging pressures or compressor pressures, then the operating conditions may be improved in that the combustion chamber 10 is continued to be operated also during the operation of the engine and the combustion gases thereof are continued to be supplied to the exhaust gas turbine 5. As a result thereof, also with small rotational speeds a higher average pressure and therewith simultaneously a better combustion can be assured.

Especially in the lower partial load range, it may be advantageous additionally if a portion of the combustion gases of the combustion chamber 10 which continues to be operated, is continued to be supplied to the charging air line 3 in order to increase also during this operating condition the charging air temperature.

It is also possible to improve the partial load operation alone by the fact that a portion of the hot exhaust gases of the diesel engine 1 is supplied with a turned-off combustion chamber 10 and correspondingly closed closure member 17, through the lines 11 and 12 into the charging air line 3 because also by such measure the aimed-at increase of the charging air temperature is assured. Instead of supplying the aforementioned portions of the exhaust gases or combustion gases to the charging air line 3, they may also be supplied to a conventional heat exchanger heating the charging air.

Furthermore, it may also be of advantage if the combustion chamber 10 is operated during an excessive load operation of the diesel engine 1 in order to achieve a higher charging air pressure than would normally result by means of the combustion gases additionally supplied to the exhaust gas turbine 5. It is thereby without importance for the aimed-at acceleration of the exhaust gas turbocharger whether the temperature of the combustion gases of the combustion chamber 10 are thereby higher or lower than the exhaust gas temperature in the exhaust gas line 4. Finally, it may be appropriate with very high suction temperatures of the supercharger to supply with a turned-off combustion chamber 10 compressed air through the line 9, the combustion chamber 10 and the line 11 with opened closure and control members 17 and 13 directly to the exhaust gas line 4 in order to prevent by a corresponding exhaust gas cooling an overheating of the exhaust gas turbine.

While I have shown and described one embodiment in accordance with the present invention, it is understood that the same is not limited thereto, but is susceptible of numerous changes and modifications as known to a person skilled in the art. In particular, the exhaust gas turbocharger may be started also in any other suitable manner from that described herein by means of the illustrated starting nozzle 20 without in any way affecting the invention and the scope of the appended claims. Consequently, I dot not wish to be limited to the details shown and described herein but intend to cover all such changes and modifications as are encompassed by the scope of the appended claims.

I claim:

1. A diesel engine arrangement, comprising: a diesel engine; a supercharger compressor having an inlet connected with the atmosphere and an outlet; charging air line means connected between said outlet and said diesel engine for supplying combustion air to said diesel engine; a throttle valve in said charging air line means; an exhaust gas turbine drivingly connected to said supercharger compressor, having an outlet connected to the atmosphere and an inlet; an exhaust gas line connected between said engine and said turbine inlet; a combustion chamber independent of said diesel engine having means therein for burning a fuel, an inlet and two outlets; an air supply line connected between said combustion chamber inlet and said charging air line means upstream of said throttle valve for supplying compressed fresh air to said combustion chamber; a first conduit connecting one of said combustion chamber outlets with said charging air line means downstream of said throttle valve; a first fluid flow regulating valve in said first conduit; a second conduit connecting the other of said combustion chamber outlets with said exhaust gas line between said diesel engine and said turbine; a second fluid flow regulating valve in said second conduit; said first and second fluid flow regulating valves constituting means for selectively supplying the entire output of said combustion chamber only to said charging air line means, selectively supplying the entire output of said combustion chamber only to said exhaust gas line, and selectively supplying the entire output of said combustion chamber simultaneously to both said charging air line and said exhaust gas line.

2. The diesel engine arrangement according to claim 1, including a fluid flow control valve in said air supply line; means for independently supplying compressed air to said turbine for starting.

References Cited

UNITED STATES PATENTS

| | | | |
|---|---|---|---|
| 2,620,621 | 12/1952 | Nettel | 60—13 |
| 2,633,698 | 4/1953 | Nettel | 60—13 |
| 3,219,105 | 11/1965 | Nettel | 60—13 |

OTHER REFERENCES

J. S. Meurer, "The M-Combustion System of M.A.N." Preprint of paper presented at the SAE Golden Anniversary Summer Meeting, Atlantic City, N.J., June 12–17, 1955, p. 15 relied on.

"Lycoming—S&H Multifuel Engine . . ." SAE Journal, July 1964, pp. 46–49 relied on.

MARTIN P. SCHWADRON, *Primary Examiner.*

DOUGLAS HART, *Assistant Examiner.*